United States Patent [19]
Nelson

[11] 3,943,284
[45] Mar. 9, 1976

[54] DIGITAL DATA COMMUNICATION SYSTEM FEATURING MULTI LEVEL ASYNCHRONOUS DUPLEX OPERATION

[75] Inventor: Robert D. Nelson, Covina, Calif.
[73] Assignee: Burroughs Corporation, Detroit, Mich.
[22] Filed: Feb. 18, 1975
[21] Appl. No.: 550,538

[52] U.S. Cl. ............................. 178/58 R; 179/15 A
[51] Int. Cl.² ........................................... H04L 5/14
[58] Field of Search ........ 179/15 A, 15 BA, 15 BM, 179/15 R; 178/58

[56] References Cited
UNITED STATES PATENTS

| | | | |
|---|---|---|---|
| 3,340,363 | 9/1967 | Bour et al. | 179/15 BA |
| 3,519,743 | 7/1970 | Herter | 178/58 |
| 3,801,748 | 4/1974 | Cotten | 179/15 A |
| 3,803,355 | 4/1974 | Fredler | 178/58 |
| 3,832,494 | 8/1974 | Seim et al. | 179/15 BA |

OTHER PUBLICATIONS
RCA Institutes, Inc. "Digital Communications", 3rd Ed., 1968, p. 1.7.
Thrasher, P., "Time Multiplex Filter", IBM Tech. Disclosure Bulletin, Vol. 6, No. 1, June 1963.

*Primary Examiner*—Kathleen H. Claffy
*Assistant Examiner*—E. S. Kemeny
*Attorney, Agent, or Firm*—Nathan Cass; Kevin R. Peterson; William B. Penn

[57] ABSTRACT

A communication system using a single transmission line for the simultaneous bidirectional transmission and reception of a plurality of asynchronous digital data signals. At each end of the transmission line, transmitting means are provided for converting a plurality of individual digital data signals into a multi-level signal. The system permits simultaneous bidirectional transmission of these multi-level signals without requiring the incorporation of a clocking signal into the transmitted signals for decoding purposes. Multi-threshold receivers at each end of the transmission line provide for unclocked decoding of a received multi-level signal, the resulting decoded signals being applied to a pulse discriminating filter for removing spurious pulses which may be introduced during the unclocked decoding as a result of phase shift errors in the signals being decoded. A dynamically variable biasing circuit controls the biasing of the receivers in accordance with the instantaneous value of any multi-level signal being simultaneously transmitted from the same end as the receivers so as to cause the receiver thresholds to appear substantially constant to a received multi-level signal, thereby permitting simultaneous bidirectional transmission and reception along the single transmission line.

13 Claims, 6 Drawing Figures

FIG_4_

DIGITAL DATA COMMUNICATION SYSTEM FEATURING MULTI LEVEL ASYNCHRONOUS DUPLEX OPERATION

BACKGROUND OF THE INVENTION

This invention relates to data transmission and in particular to improved means and methods for transmitting and receiving a plurality of digital data signals over a single transmission line.

Computer systems often involve a plurality of units such as processors, memories and input-output devices which are located some distance apart and are connected by transmission lines, such as electrical cables. Since a considerable number of interconnections are required between such units, the cost, complexity and space requirements of the transmission lines interconnecting the units are substantial. These problems can be reduced by using each transmission line to carry as many data signals as is deemed to be practical. Also, it is of a advantage that the communication system by such as to permit the data signals to be transmitted and received asynchronously with respect to one another, and also, without the need for incorporating additional clocking in the transmitted signal for use in decoding the received signal.

SUMMARY OF THE INVENTION

Accordingly, it is a broad object of the present invention to provide improved means and methods for transmitting and receiving a plurality of digital data signals on a single transmission line.

Another object of the invention is to provide simultaneous transmission and reception on a single transmission line of a plurality of digital data signals which may be asynchronous with respect to each other.

A further object of the invention is to provide for the transmission and reception on a single transmission line of a multi-level signal representative of a plurality of asynchronous digital data signals without requiring the incorporation of a clocking signal into the transmitted multilevel signal for decoding of received signals.

A still further object of this invention is the provision of a communication system for the simultaneous bidirectional transmission and reception on a single transmission line of multi-level signals representative of binary data signals from a plurality of sources.

Still another object of this invention is to provide a data communication system in accordance with one or more of the foregoing objects in which filter means are provided in combination with unclocked receiver decoding means for removing spurious pulses which may appear in the decoder output because of phase shift errors in the signals being decoded.

According to a preferred embodiment of the present invention, simultaneous bidirectional transmission and reception of a plurality of binary data signals are provided on a single transmission line. For transmission, one or more switched current drivers are directly coupled to each end of the transmission line, each current driver being controlled by a binary data signal. The output current of each driver has a predetermined amplitude sufficiently different from the currents provided by other current drivers at the same end of the line so as to be distinguishable therefrom. At each end of the transmission line, the predetermined currents of the individual drivers at that end are combined to form a multi-level signal.

There is also coupled to each end of the transmission line an unclocked multi-threshold receiver having associated logic and filtering circuitry which cooperate to provide for the decoding of a multi-level signal received from the transmission line, without the need for clocking, into the corresponding plurality of individual binary data signals controlling the current drivers at the other end of the transmission line.

In order to provide for simultaneous bidirectional transmission and reception using a single transmission line, means are provided associated with the receivers at each end for dynamically varying the receiver thresholds. These dynamic threshold variations are provided so as to permit the receiver circuits at each end of the line to properly decode a received multi-level signal at the same time that a multi-level signal is simultaneously being transmitted to the opposite end of the line.

BRIEF DESCRIPTION OF THE DRAWINGS

Other objects, features, advantages and uses of the invention will become apparent to those skilled in the art as disclosure is made in the following description of preferred embodiments of the invention as illustrated in the accompanying drawings in which the same reference numerals and symbols are used in each of the several drawings to represent the same elements.

DETAILED DESCRIPTION OF A PREFERRED EMBODIMENT

Figure 1:
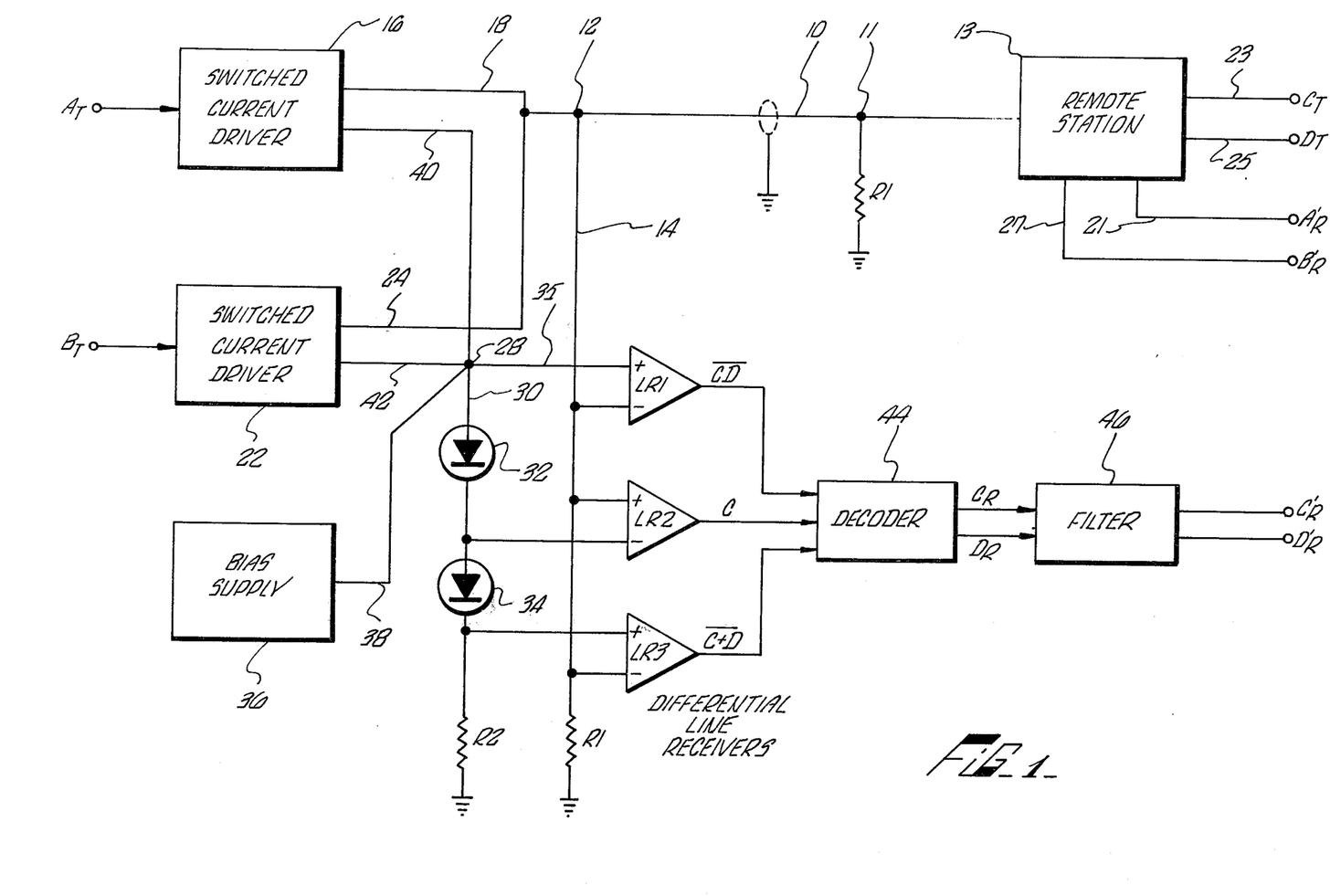
FIG. 1 is partly a functional block diagram and partly a schematic diagram for a preferred embodiment of this invention capable of simultaneously transmitting and receiving four-level signals, i.e., a bidirectional system for simultaneously transmitting and receiving two channels in each direction on a single transmission line.

In FIG. 1, there is shown a transmission line 10 having a local terminal or junction 12 at one end of the line and a remote terminal 11 at the other end of the line. Typically, the transmission line 10 may serve to provide electrical communication between two distinct units within a data processing system located at opposite ends of the line. It is to be understood that, in this preferred embodiment, there are transmitting and receiving circuits (not shown) at the remote station 13 connected to the remote terminal 11 which may have the same structure and function as those shown in FIG. 1 connected to the local terminal 12. A description of the construction and operation of the circuitry with respect to the local terminal 12 will thus also be applicable to the remote station 13.

The transmission line 10 is terminated at each of its ends by a resistor R1 having a resistance equal to the characteristic impedance of the transmission line 10. At the local terminal, R1 is connected to the junction 12 by conductor 14. The junction 12 is a summing junction for currents representing both the data signals being transmitted to the remote station 13 as well as the data signals being received from the remote station 13.

The transmitting circuitry of FIG. 1 comprises switched current drivers 16 and 22 responsive to bit serial binary data signals $A_T$ and $B_T$, respectively, which may be asynchronous. Switched current driver 16 delivers a predetermined amount of current, for example 30 milliamperes, along conductor 18 to the junction 12 when the bit serial binary data signal $A_T$ coupled to the input of current driver 16 has a true binary state, and delivers, for example, zero milliamperes when $A_T$ has a false binary state. Switched current driver 22 delivers a different predetermined amount of current, for example fifteen milliamperes, along conductor 24 to the junction 12 when the bit serial binary data signal $B_T$ coupled to the input of switched current driver 22 has a true binary state, and a zero current when $B_T$ has a false binary state. The current supplied by current drivers 16 and 22 are summed algebraically at junction 12, the relative impedances typically being such that one-half of the total current supplied to junction 12 by the current drivers 16 and 22 flows to the transmission line 10 to be propagated to the remote terminal 11, while the remaining half of the current flows through conductor 14 to the grounded terminating resistor R1.

It will be understood that additional pluralities of binary data signals may be encoded into a single multi-level signal in accordance with the invention. Given n bit serial binary data signals A, B . . . , N, a suitable $2^n$-level signal is created where the encoding is accomplished according to the algebraic relationship $(2^{n-1})A+(2^{n-2})B+ \ldots +N$. In the embodiment of FIG. 1, since only two signals are being transmitted, n is equal to two and the multi-level signal created at the summing junction for transmission is a four-level signal corresponding to 2A+B. A similar logical encoding technique for encoding a plurality of binary data signals into a multi-level signal is disclosed in U.S. Pat. N0. 3,267,459.

In the preferred embodiment of the invention illustrated in FIG. 1, it is to be understood that two switched current drivers (not shown), similar to current drivers 16 and 22, are provided in the remote station 13 coupled to the remote terminal 11 for transmission to the junction 12, via the transmission line 10, of another distinct four-level signal formed from asynchronous binary data signals $C_T$ and $D_T$ according to the algebraic relationship 2C+D. For the purposes of this description the time required for propagation and any losses in the transmission line 10 may be neglected. At junction 12, a received four-level signal is summed algebraically with any four-level transmission signal current which is being transmitted at the same time.

Considering now the receiving portion of FIG. 1, it will be seen that three line receivers LR1, LR2 and LR3 are provided in the preferred embodiment. In general, where a multi-level signal resulting from the encoding of n binary data signals is present, $2^n-1$ line receivers, or the equivalent, will be required. In the preferred embodiment of FIG. 1, the same number of binary signals (two) are being transmitted and received via the junction 12. However, this invention does not require such symmetry. In a bidirectional communication system, the number of line receivers required at each end of the transmission line depends on the larger of the number of binary data signals combined in the multi-level signal encoded at either end of the line. In accordance with this invention, the number of binary data signals encoded for transmission at a terminal may be greater than, less than, or, as here, equal to the number of binary data signals being received at a transmission line terminal.

Each of the line receivers LR1, LR2 and LR3 in FIG. 1 is a threshold-responsive differential amplifier or comparator which provides a logical output, true or false, 1 or 0, depending upon the polarity and amplitude of the voltage applied to the differential inputs of the device. The line receivers may be any suitable commercially available integrated circuit unit such as the type included in Part No. MC3450 manufactured and sold by Motorola Semiconductor Products Inc.

An important feature of the invention resides in the provision of dynamic biasing for the three line receivers LR1, LR2 and LR3. Such dynamic biasing is provided so that the threshold level to which each line receiver is responsive will remain substantially constant with respect to a received multi-level signal even when a multi-level signal is simultaneously being applied to the junction 12 by the current drivers 16 and 22 for transmission to the remote station 13. This dynamic biasing is accomplished by coupling one input terminal from each of the line receivers LR1, LR2 and LR3 to appropriate points on a series biasing circuit path extending from a junction 28 which is provided with a voltage that varies in accordance with the instantaneous value of any signal being transmitted. As shown in FIG. 1, junction 28 is connected to circuit ground through the conductor 30, a first diode 32, a second diode 34 and a biasing resistor R2. The biasing resistor R2 may typically have a resistance slightly greater than that of the terminating resistor R1. For example, for a 95 ohm transmission line, R1 will likewise have a resistance of 95 ohms, in which case R2 may have a resistance of 100 ohms.

The non-inverting signal input terminal of line receiver LR1 is coupled by the conductor 35 to the junction 28. The inverting signal input terminal of line receiver LR2 is coupled between the diodes 32 and 34. The non-inverting signal input terminal of line receiver LR3 is coupled between the diode 34 and the biasing resistor R2. The other input terminal of each of the line receivers, LR1, LR2 and LR3 is coupled to the conductor 14. As a result, the voltage developed across R1 is applied to one input terminal of each line receiver, while the other terminal of each line receiver receives a dynamically variable bias for causing the receiver threshold to remain substantially constant even when signals are being simultaneously transmitted and received.

As illustrated in FIG. 1, a bias supply 36 is provided for the series biasing circuit path. The bias supply 36 delivers a small constant current from its output terminal to the junction 28 by way of conductor 38. This current from the bias supply 36 is the static bias signal which sets the threshold for the line receivers in the absence of any transmitted signals. The static bias signal is sufficient to drive each of the two diodes 32 and 34 into the approximately constant-voltage-drop region of its operating characteristic, while providing predetermined threshold values for the line receivers LR1, LR2 and LR3 chosen to cause each receiver to reside in a particular one of its logical states so long as its threshold is not exceeded. For example, given a static bias signal of 3.75 milliamperes, a resistance of 100 ohms for R2, and a constant voltage drop across each of the diodes of 0.75 v., a static bias voltage of 0.375 v. is applied to the non-inverting signal input terminal of LR1, a static bias voltage of 1.125 v. is applied to the inverting signal input terminal of LR2, and a static bias voltage of 1.875 v. is applied to the inverting signal input terminal of LR1. With the biasing arrangement shown in FIG. 1 and no signals appearing at the junction 12, LR1 and LR3 will be true, while LR2 will be false.

At the same time that switched current driver 16 is caused to deliver 30 milliamperes to conductor 18 in response to $A_T$ being true, it also delivers approximately half that amount of current, or 15 milliamperes to its second output conductor 40. This latter current, which is employed in producing the dynamic bias signal, flows to the junction 28 where it is algebraically summed with the static bias signal in the conductor 30. This causes all of the bias voltages applied to the line receivers LR1, LR2 and LR3 to be increased, for example, by 1.5 v. Similarily, in response to $B_T$ being true, switched current driver 22 causes a signal of 7.5 milliamperes to be delivered to junction 28 through conductor 42 raising the bias voltages applied to the line receivers by, for example, 0.75 v. It will thus be evident that the combination of static and dynamic bias signals applied to the line receivers LR1, LR2 and LR3 are chosen so that a transmitted milti-level signal applied to junction 12 will cause corresponding dynamic variations in the biasing of the line receivers, whereby the effective line receiver threshold levels will appear to remain substantially constant to a received multi-level signal developed across $R_t$, even during simultaneous transmission and reception.

The respective predetermined threshold levels of the three line receivers LR1, LR2 and LR3 in FIG. 1 are chosen so as to derive from a received multi-level signal the predetermined binary digital outputs $\overline{CD}$, C and $\overline{C+D}$. These derived signals are in turn applied to a decoder 44 for producing binary data output signals $C_R$ and $D_R$ respectively corresponding to the binary data signals $C_T$ and $D_T$ encoded at the remote station 13. In order to remove any spurious pulses which may have been introduced into these binary data signals $C_R$ and $D_R$, the output of decoder 44 is applied to a pulse discriminating means, such as the filter 46, which is designed to produce resulting binary data signals $C_R'$ and $D_R'$ from which such spurious pulses have been removed. The construction and operation of the decoder 44 will be more fully explained hereinafter in connection with the discussion of FIG. 3. The construction and operation of the filter 46 will be more fully explained in connection with the discussion of FIGS. 4–6.

Figure 2:
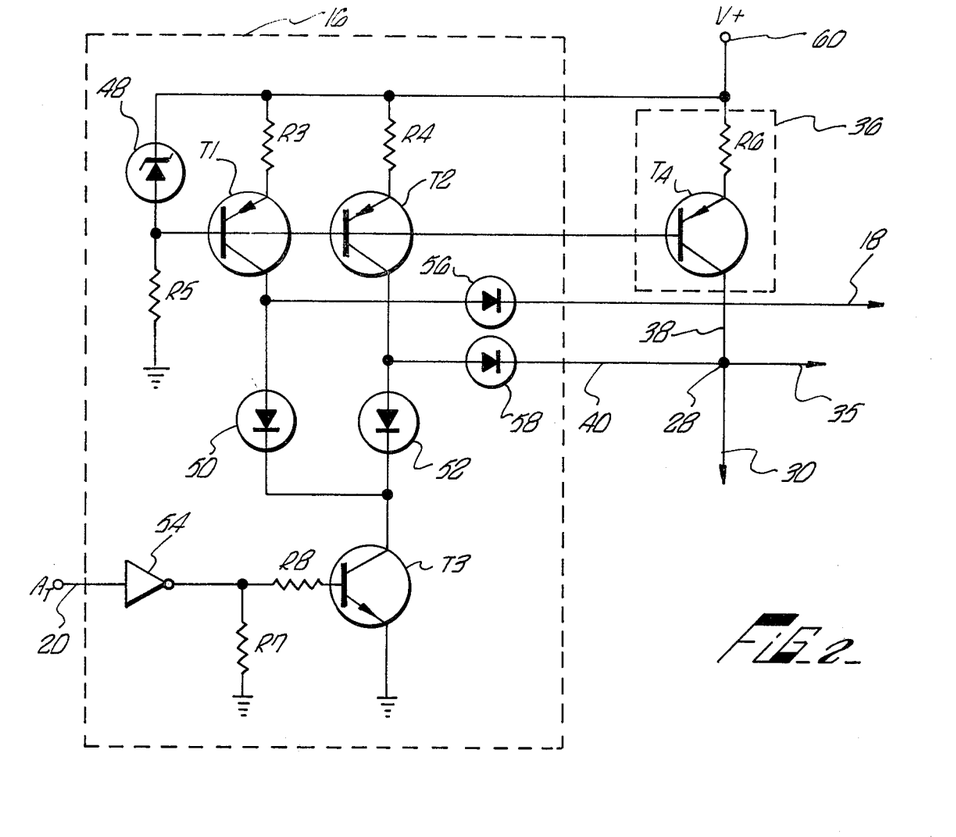
FIG. 2 shows a detailed schematic diagram for the bias supply and one of the switched current drivers shown more generally in FIG. 1.

FIG. 2 shows the details of circuits which are suitable for use as the switched current driver 16 and the bias supply 36. A positive voltage, V+, from a D.C. power supply is applied to the terminal 60 and, from there, to the resistors R3, R4 and R6 in the emitter circuits of transistors T1, T2 and T4 respectively. The resistance values for resistors R3, R4 and R6 are chosen so that their respective transistor circuits will supply the predetermined amount of current desired. The magnitude of the positive voltage V+ is chosen to be sufficiently high so that the collector circuit of T1 will be capable of delivering the predetermined current desired of it to conductor 18 (and junction 12) for the highest voltage which may appear at junction 12. Current from terminal 60 also flows through zener diode 48 and resistor R5 to provide a constant voltage drive signal for the base to emitter circuits of the transistors T1, T2 and T4. The base of each of these transistors is coupled to the junction between the zener diode 48 and the resistor R5. Transistor T4, having the resistor R6 in its emitter circuit, comprises the bias supply circuit 36. The collector of T4 is coupled to the junction 28 to supply the static bias signal to line receiver LR1 on conductor 35 and to line receivers LR2 and LR3 by way of conductor 30 (see FIG. 1). The switched current driver 16 comprises transistors T1, T2 and T3 along with their associated circuitry. Transistor T3 is switched either into full conduction or cut off depending on the state of the output of the inverting buffer amplifier 54 which is coupled to the base of T3 through resistors R7 and R8. When T3 is switched into full conduction, substantially all of the collector current of T1 flows through the diode 50 and substantially all of the collector current of T2 flows through the diode 52 and then through the collector-emitter circuit of T3 to ground. Transistor T3 is switched into full conduction when the binary data signal $A_T$ is at ground potential or below, its false state. When $A_T$ is at a sufficiently high potential, its true state, T3 is switched off and the collector current of transistor T1 is directed through diode 56 to conductor 18 and thence to the junction 12 of FIG. 1. For this embodiment, the value of R3 is chosen so that the collector current of T1 will be 30 milliamperes when $A_T$ is true, as discussed above. Similarly, for $A_T$ in its true state, transistor T3 supplies a dynamic bias signal of 15 milliamperes to the junction 28 by way of diode 58 and conductor 40. Diodes 56 and 58 insure that the impedance looking into the output of switched current driver 16 is high enough to appear to be an open circuit to the remainder of the system. Resistor R4 will have a resistance approximately twice that of resistor R3 to set tye dynamic bias signal at the predetermined value of 15 milliamperes.

Switched current driver 22 for binary data signal $B_T$ is not shown in FIG. 2. However, its structure and interconnection with junctions 12 and 28 is identical to that shown for switched current driver 16. The only differences are in the resistance values of the emitter resistors, those corresponding to R3 and R4. The corresponding resistances for switched current driver 22 will be approximately twice that of R3 and R4 to produce the currents required for the encoded four-level transmission signal as well as for dynamic biasing purposes.

Figure 3:
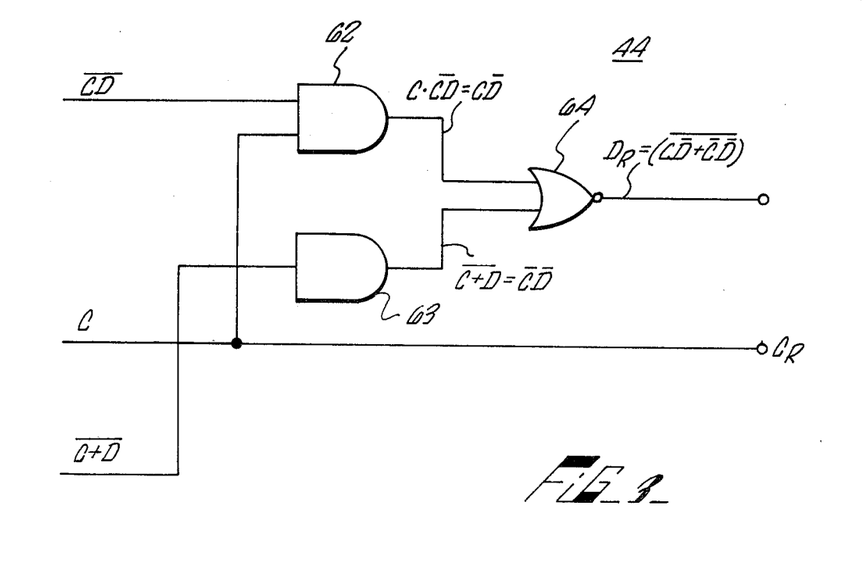
FIG. 3 illustrates a preferred embodiment of the decoder illustrated in block form in FIG. 1.

FIG. 3 shows a preferred form of the decoder 44 comprised of AND gates 62 and 63 and NOR gate 64. As noted above, the inputs to the decoder 44 are the binary signals $\overline{CD}$, C and $\overline{C+D}$ derived from the received multi-level signal by line receivers LR1, LR2 and LR3. As shown in FIG. 3, the input binary signal C is fed directly to the decoder output to serve as the decoder output signal $C_R$. The signal C is also fed to AND gate 62. The remaining input signals $\overline{CD}$ and $\overline{C+D}$ are applied to AND gates 62 and 63 and thence to NOR gate 64 for producing the decoder output signal $D_R$. Such logic may, for example, be the same as that shown in FIG. 1 of the above-referenced U.S. Pat. No. 3,267,459. However, a significant difference is that the gates shown in FIG. 3 of the present invention need not be clocked, since the present invention does not require such clocking. Both of the AND gates 62 and 63 in FIG. 3 are preferably of the same type. As shown, the binary signals C and $\overline{CD}$ are applied through AND gate 62 to one input of NOR gate 64, while the binary signal $\overline{C+D}$ is transmitted to the other input of NOR gate 64 through normally open AND gate 63 so that both of the two inputs to NOR gate 64 will be subjected as closely as possible to the same propagation delays. It will be understood that the Boolean equation representative of the operation of AND gates 62 and 63 and NOR gate 64 in FIG. 3 for producing the output binary signal $D_R$ is $C \cdot \overline{CD} + \overline{C+D} = \overline{C \ \overline{D} + C \ \overline{D}} = D_R$.

As pointed out previously herein, the transmitting and receiving system of the preferred embodiment of the present invention is intended to be capable of use with asynchronous binary data signals, and also without the need for incorporating a clocking signal into the transmitted multi-level signal for use in decoding the received signal, as is required, for example, in the aforementioned U.S. Pat. No. 3,267,459. Thus, in the present invention, decoding of the asynchronous binary data signals contained in the received multi-level signals is performed by the decoder 44 in FIGS. 1 and 3 without the use of clocking. As a result, since relative phase shift errors may be introduced into the signals being decoded because of transmission line distortions, threshold switching variations and/or differences in circuit propagation delays, it is possible for situations to occur which will produce spurious pulses in the resulting decoder output signals. Such situations will be better understood by reference to the waveforms of FIG. 4 which illustrate one possible example of how a spurious pulse might be produced and removed in accordance with the invention. For the purposes of the present invention, a spurious pulse will be defined as a pulse which is produced during logical decoding because of the occurrence of a relative phase shift error between logically related signals being decoded, such spurious pulses normally having a significantly shorter duration than the period of the signals comprising the binary signals being decoded.

Figure 4:
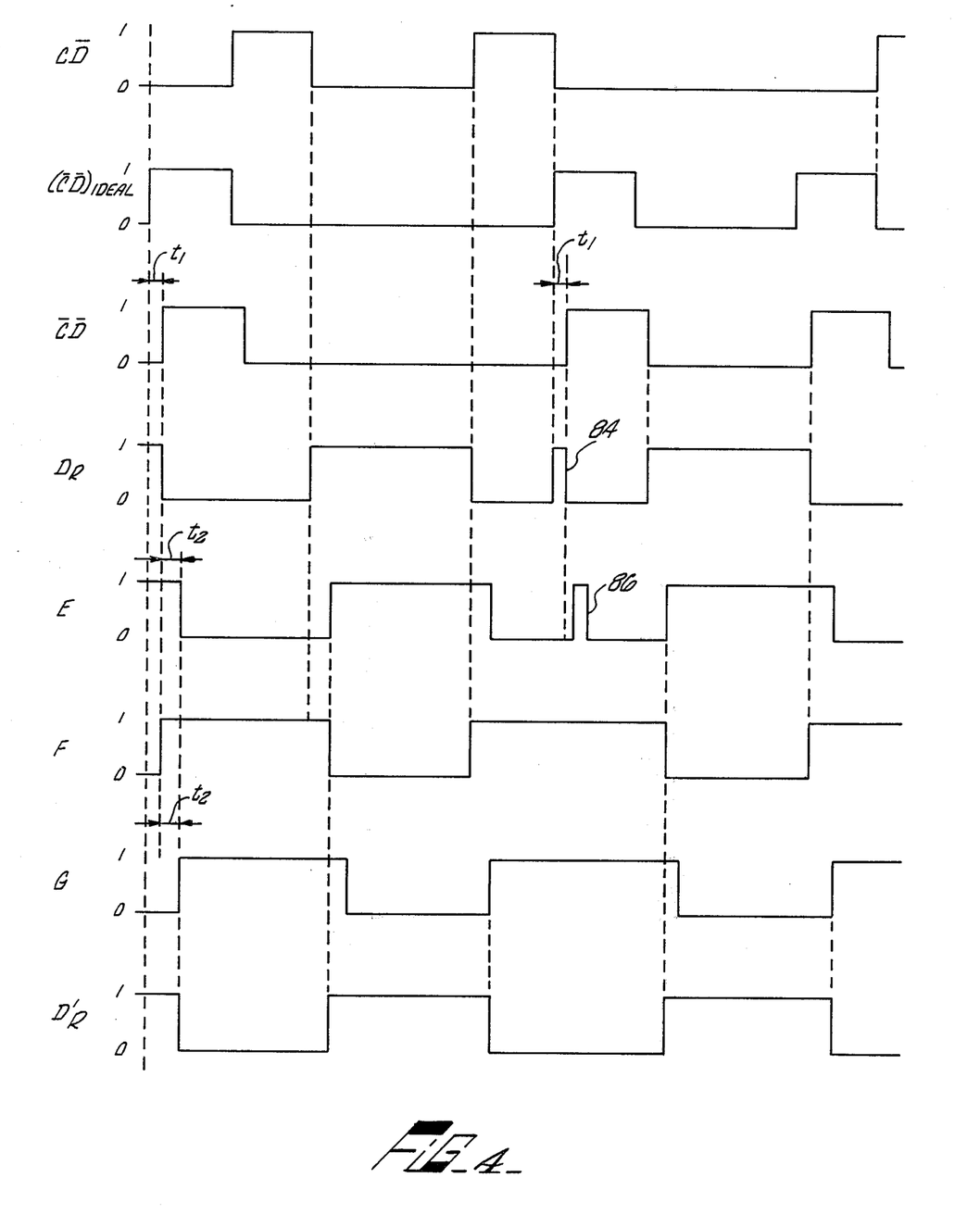
FIG. 4 illustrates examples of signal waveforms which may be present at various points in the decoder of FIG. 3 and in the filter of FIG. 5.

The first signal waveform in FIG. 4 is an example of a signal $C \ \overline{D}$ which might appear at the upper input of NOR gate 64 in the decoder 44 of FIG. 3. The second waveform in FIG. 4 is an example of a signal $C \ \overline{D}$ which should ideally appear at the lower input of NOR gate 64 when no relative phase shift error is present between $C \ \overline{D}$ and $\overline{C} \ \overline{D}$. The third waveform in FIG. 4 is an example of a signal $\overline{C} \ \overline{D}$ which has been phase shifted by a time $t_1$ from its proper phase position due to any one or more of the reasons mentioned above. The fourth waveform in FIG. 4 represents the resulting decoder output signal $D_R$ which will be obtained as a result of the logical combination by NOR gate 64 of the second and fourth signals $C \ \overline{D}$ and $\overline{C} \ \overline{D}$ having the relative phase shift error $t_1$ illustrated in FIG. 4. It will be noted that this relative phase shift $t_1$ has caused a spurious pulse 84 to be introduced into the decoder output signal $D_R$. An important feature of the present invention resides in the provision of means for removing such spurious pulses by feeding the decoder output signals to a pulse discriminating means such as the filter 46 shown in block form in FIG. 1, a preferred embodiment thereof being illustrated in FIG. 5.

Figure 5:
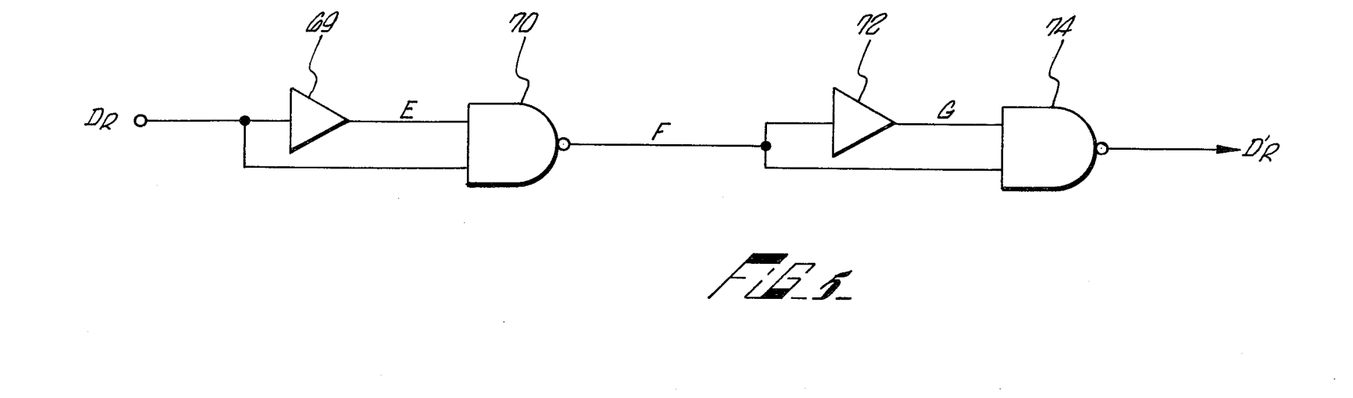
FIG. 5 illustrates a preferred embodiment of a filter for removing spurious pulses from the output signal produced by the decoder of FIG. 3.
Figure 6:
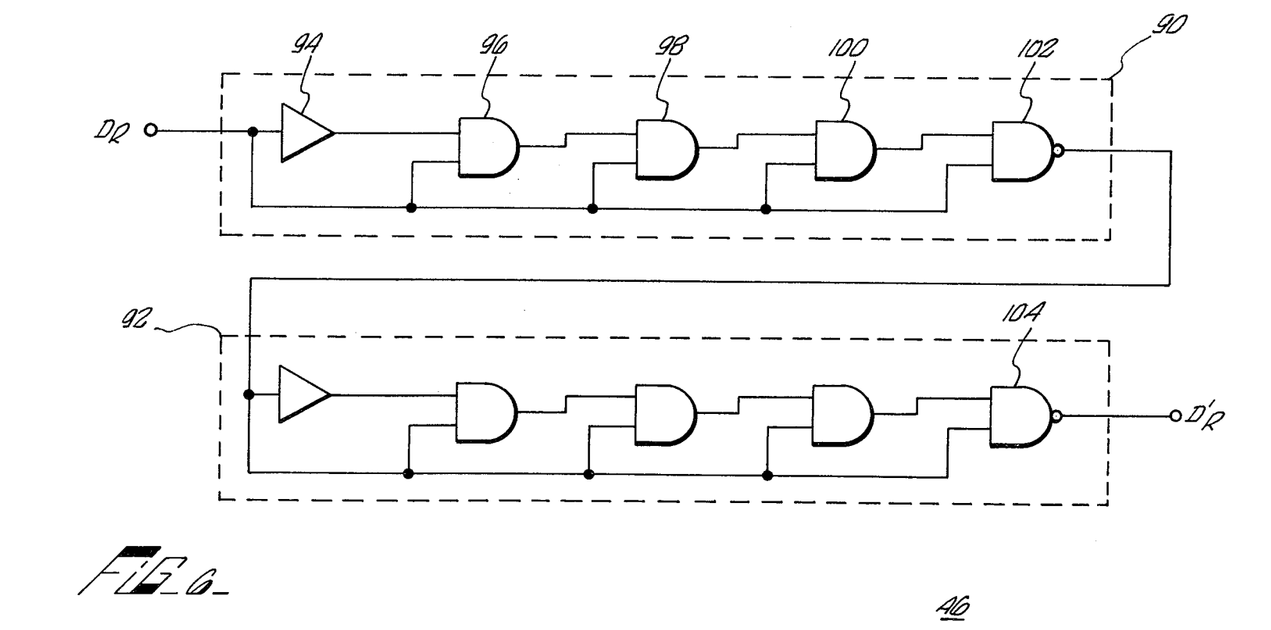
FIG. 6 illustrates a preferred embodiment of a second type of filter for removing spurious pulses from the decoder output signal.

In the filter 46 of FIG. 5, the signal $D_R$ produced at the output of the decoder 44 (FIG. 4) is supplied to a time delay circuit 69 which may typically be an amplifier 69 providing a known selected time delay $t_2$. The output of the amplifier 69 is a signal E which is applied to one of the inputs of the two-input NAND gate 70.

The signal $D_R$ is applied to the other input of the NAND gate 70. The output of the gate 70 is the signal F. The amplifier 69 and the gate 70 comprise the first stage of the filter 46.

The resulting waveforms of the signals E and F are illustrated by the fifth and sixth waveforms, respectively, shown in FIG. 4. The delay $t_2$ introduced by amplifier 69 is chosen to appropriately shift the phase of the resulting signal E relative to the applied signal $D_R$ so that no part of the spurious pulse 86 occurring in E occurs simultaneously with the spurious pulse 84. If a single amplifier 69 is insufficient to produce the required time delay of E relative to $D_R$, then a plurality of such amplifiers may be used in cascade. It will be understood that having thus provided a sufficient amount of phase shift between the signals $D_R$ and E so that there is no overlap between any positive spurious pulses 84 and 86, in $D_R$ and E, no positive spurious pulse will appear in the resulting signal F produced at the output of NAND gate 70, as illustrated by the seventh waveform in FIG. 4.

The first stage of the filter 46 comprised of amplifier 69 and NAND gate 70 thus serves to remove positive spurious pulses from the input signal $D_R$, such as illustrated by the spurious pulse 84 in the waveform $D_R$ in FIG. 4. However, it will be noted with respect to the signal F in FIG. 4 that the first filter stage lengthens the time intervals F = 1 by the time delay $t_2$, while shortening the intervals F = 0 by the delay $t_2$, as compared to $D_R$. Accordingly, in order to cancel out this lengthening and shortening, it is preferred to provide a like additional second stage for filter 44 comprising an amplifier 72 (providing the same delay $t_2$ as the first stage amplifier 69) and a NAND gate 74. The resulting output signal $D_R'$ from this second filter stage is illustrated by the bottom waveform in FIG. 4 which will be seen to have the same length intervals as the input signal $D_R$.

The above example has considered the removal of only positive spurious pulses from the decoder output signal $D_R$. If negative spurious pulses are also present in $D_R$, it will be understood that the operation of the first and second filter stages is such that any such negative spurious pulses will still be present in the signal $D_R'$ produced at the output of the second filter stage, although the number and/or time duration thereof may be different from those appearing in the original signal $D_R$. Thus, if it is desired to also provide for the removal of negative spurious pulses from the decoder output signal $D_R$ as well as positive spurious pulses, the second stage filter output signal $D_R'$ is inverted and applied to third and fourth filter stages (not shown) having a time delay appropriately chosen for removing these negative spurious pulses from the signal $D_R'$. It will be understood that these additional third and fourth filter stages may have a like construction and operation as described for the first and second filter stages in FIG. 5. Accordingly, these additional third and fourth filter stages have not been specifically shown in FIG. 5, but they are to be considered as included in the filter 46 of FIG. 1 where removal of both positive and negative spurious pulses is desired.

Another embodiment of a filter for removing positive spurious pulses is shown in FIG. 7. This type of filter is particularly useful for removing spurious pulses occurring close to valid transitions. Filter stages 90 and 92 are substantially identical to each other and provide for the removal of positive spurious pulses, respectively in the input signal $D_R$. The first filter stage 90 comprises a time delay circuit provided by an amplifier 94, a plurality of AND gates 96, 98 and 100, and a NAND gate 102. Typically, the operation of stage 90 is such that each of the AND gates 96, 98 and 100 removes a slice from a positive spurious pulse with the remaining slice being removed by NAND gate 102. The second filter stage 92 comprises similar elements as the first stage 90 and, similarly to the second filter stage in the embodiment of the filter of FIG. 5, is preferably provided to cancel out the lengthening and shortening of the signal intervals caused by the first stage. Also, as pointed out with respect to the filter of FIG. 5, where negative as well as positive spurious pulses are to be removed, the signal at the output of the second filter stage in FIG. 7 is inverted and applied to third and fourth filter stages (not shown) which are constructed for like operation as the first and second filter stages of FIG. 7.

While only certain preferred features of the invention have been discussed above by way of illustration, many modifications will occur to those skilled in the art. For example, it is apparent that the invention is also of significant value for use in a unidirectional communication system as well as in a bidirectional communication system.

It will also be apparent that the present invention may readily be extended for encoding, transmitting and receiving more than the two binary data signals in each direction in the preferred embodiment.

It is, therefore, to be understood that the appended claims cover the above-mentioned modifications and all other modifications coming within the true spirit and scope of the invention.

What is claimed is:

1. In a system for transmitting and receiving a plurality of asynchronous individual digital data signals using a single transmission line, the combination comprising:
   transmitting means for converting said plurality of digital data signals into a multi-level signal and for applying said multi-level signal to one end of said transmission line for transmission thereby;
   unclocked receiving means at the other end of said transmission line for receiving a multi-level signal and for decoding the received multi-level signal into a plurality of digital signals representative of said plurality of individual digital data signals; and
   pulse discriminating means to which the decoded digital signals are applied for removing spurious pulses therefrom having a significantly shorter duration than that of the decoded digital signals.

2. The invention in accordance with claim 1, additionally including:
   a second transmitting means for converting a second plurality of individual digital data signals into a second multi-level signal and for applying said second multi-level signal to the other end of said transmission line;
   a second unclocked receiving means at said second end of said transmission line for receiving a multi-level signal and for decoding the received multi-level signal into a plurality of digital signals representative of said second plurality of individual digital data signals; and
   second pulse discriminating means to which the decoded digital signals representative of said second plurality of individual data signals are applied for removing spurious pulses therefrom having a significantly shorter duration than that of the decoded digital signals.

3. The invention in accordance with claim 2, wherein each unclocked receiving means includes:
   a plurality of receivers having bias-controllable thresholds chosen to provide for decoding of a received multi-level signal; and
   dynamically variable biasing means responsive to a multi-level signal being transmitted at the same end of the transmission line as the receiving means for controlling the biasing of said receiving means in a manner so that the thresholds provided thereby appear substantially constant to a received multi-level signal even during simultaneous transmission of a multi-level signal from the same end of the transmission line.

4. The invention in accordance with claim 1, wherein said pulse discriminating means is a filter having a first stage comprising:
   means for delaying a decoded digital signal so that there is no overlap between the coorresponding spurious pulses in the delayed and undelayed decoded digital signals; and
   means for logically combining the undelayed and delayed decoded digital signals in a manner so as to poduce a resulting decoded digital signal from which spurious pulses have been removed as a result of there being no overlap between the corresponding spurious pulses in the delayed and undelayed decoded digital signals.

5. The invention in accordance with claim 4, wherein said pulse discriminating means also includes a second stage following said first stage for compensating for variations in the time durations of the decoded digital signals produced by said first stage.

6. The invention in accordance with claim 5, wherein said filter additionally includes third and fourth stages following said first and second stages, said third stage being operative to remove spurious pulses having an opposite polarity to those removed by said first stage, and said fourth stage being operative to compensate for timing variations produced by said third stage.

7. The invention in accordance with claim 1, wherein said pulse discriminating means is a filter including successive logical circuits which operate to remove a spurious pulse from a decoded digital signal by successively removing slices from the spurious pulse until the pulse is eliminated.

8. The invention in accordance with claim 7, wherein said filter includes means for compensating for variations in time durations of the decoded digital signal produced by the removal of spurious pulses.

9. In a system for transmitting and receiving digital data signals using a single transmission line, improved means coupled to one end of said line capable of transmitting a first multi-level signal representative of a first plurality of individual digital data signals while simultaneously receiving and decoding at said one end a second multi-level signal representative of a second plurality of individual digital data signals, said improved means comprising:
   transmitting means for converting said first plurality of digital data signals into said first multi-level signal and for applying said first multi-level signal to one end of said transmission line for transmission thereby;
   a plurality of unclocked receivers coupled to said one end of said transmission line, one for each of the levels of said second multi-level signal, each receiver having a bias-controllable threshold chosen so that the receivers together provide for detecting all of the levels of said second multi-level signal;

logical decoding means coupled to the outputs of said receivers for producing decoded digital signals representative of said second plurality of individual digital data signals; and dynamically variable biasing means responsive to a first multi-level signal being transmitted by said transmitting means for controlling the biasing of said receivers so that the thresholds provided thereby appear substantially constant to a received second multi-level signal even during simultaneous transmission of a first multi-level signal by said transmitting means.

10. The invention in accordance with claim 9, including:

pulse discriminating means to which the decoded digital signals are applied for removing spurious pulses therefrom having a significantly shorter duration than that of said decoded signals.

11. The invention in accordance with claim 9, wherein said transmitting means includes a plurality of switchable current drivers responsive to said first plurality of digital data signals whose outputs are summed to form said first multi-level signal, and wherein said dynamically variable biasing means includes a biasing circuit path responsive to outputs from said current drivers for causing corresponding variations in the biasing of said receivers.

12. A method for the simultaneous transmission and reception of multi-level signals at one end of a transmission line wherein the transmitted and received multi-level signals are each representative of a corresponding plurality of individual digital data signals, said method comprising the steps of:

converting a first plurality of digital data signals into a first multi-level signal;

applying said first multi-level signal to one end of said transmission line;

decoding a second multi-level signal received at said one end of said transmission line by steps including detecting the levels of the received multi-level with reference to predetermined threshold values chosen so as to produce resulting digital signals representative of a second plurality of individual data signals;

dynamically varying said predetermined threshold values in accordance with the instantaneous value of a transmitted multi-level signal so that the thresholds appear substantially constant to a received multi-level signal even during simultaneous transmission of a first multi-level signal from said one end of said transmission line; and filtering said resulting digital signals by removing therefrom spurious pulses having a significantly shorter duration than that of said resulting digital signals.

13. A method providing for the simultaneous bidirectional transmission of a plurality of asynchronous individual digital data signals using a single transmission line, said method comprising the steps of:

converting a first plurality of individual data signals into a first multi-level signal and applying said first multi-level signal to one end of said transmission line;

converting a second plurality of individual data signals into a second multi-level signal and applying said second multi-level signal to the other end of said transmission line;

decoding a received multi-level signal at each end of said transmission line by steps including detecting the levels of the received multi-level signal with reference to predetermined bias-controllable threshold values chosen so as to produce resulting digital signals representative of the corresponding plurality of individual digital data signals transmitted from the other end of the transmission line;

dynamically varying the biasing of said predetermined threshold values at each end of the transmission line in accordance with the instantaneous value of a multi-level signal being simultaneously transmitted from that end so that the thresholds at each end appear substantially constant to a received multi-level even during simultaneous transmission and reception of a multi-level signal at each end; and filtering the resulting decoded digital signals by removing therefrom spurious pulses having a significantly shorter duration than that of the resulting decoded digital signals.

* * * * *

UNITED STATES PATENT AND TRADEMARK OFFICE
CERTIFICATE OF CORRECTION

PATENT NO. : 3,943,284
DATED : March 9, 1976
INVENTOR(S) : Robert D. Nelson

It is certified that error appears in the above-identified patent and that said Letters Patent are hereby corrected as shown below:

Col. 1, line 21, change "by" to --be--.
Col. 4, line 33, change "the" to --a--.
Col. 5, line 30, change "milti-level" to --multi-level--.
Col. 6, line 39, change "tye" to --the--.
Col. 7, line 43, change "C" to --C--.
Col. 9, line 28, between "direction" and "in" insert --disclosed--.
       line 63, at beginning of line insert --a--.
Col. 10, line 24, change "poduce" to --produce--.

Signed and Sealed this eighteenth Day of May 1976

[SEAL]

Attest:

RUTH C. MASON
Attesting Officer

C. MARSHALL DANN
Commissioner of Patents and Trademarks